Jan. 24, 1967     L. O. PARKER     3,299,890
SURGICAL BANDAGE, DRESSING AND THE LIKE
Filed June 11, 1963     7 Sheets-Sheet 1
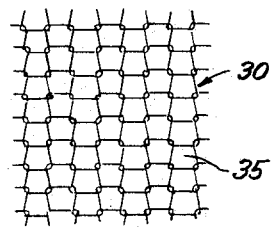
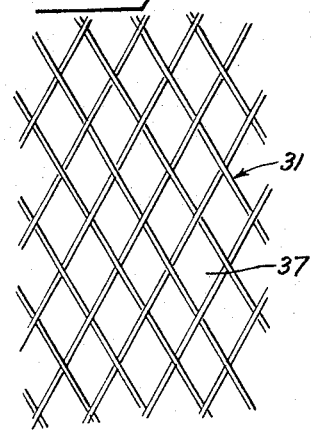
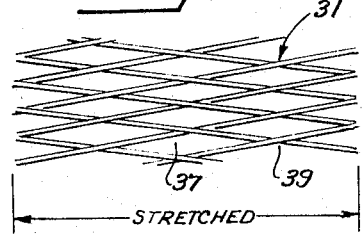
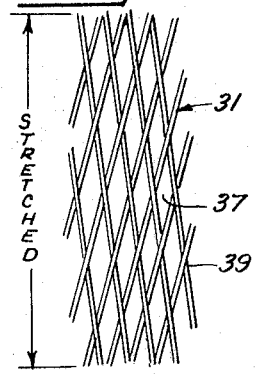
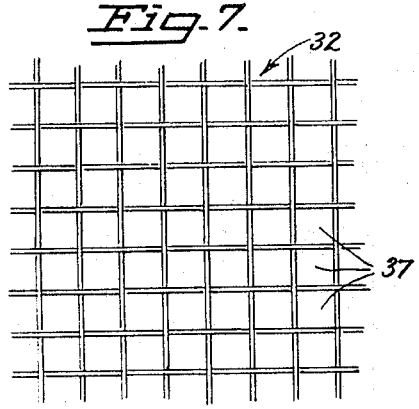
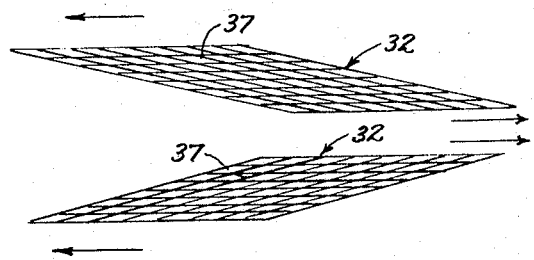
INVENTOR.
LEON O. PARKER
BY
ATTORNEYS

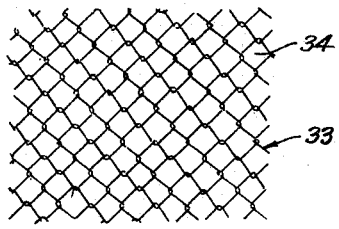
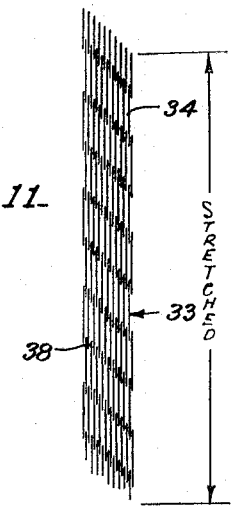
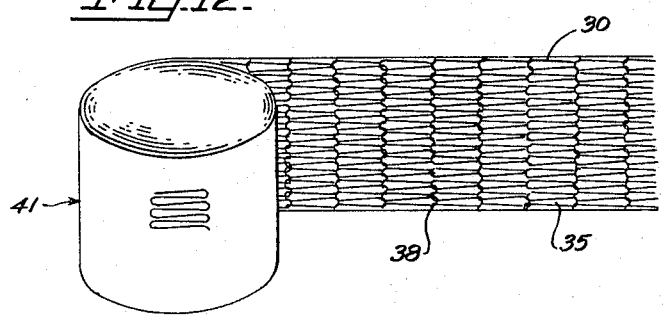
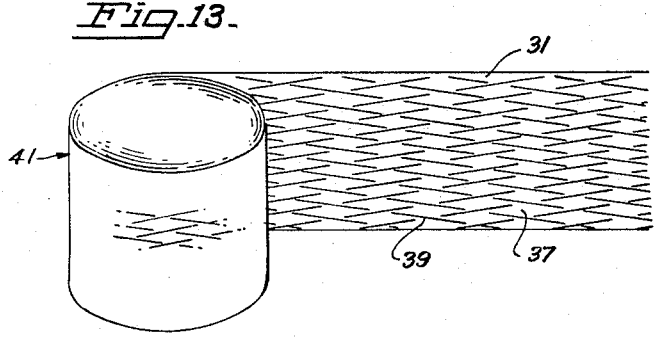
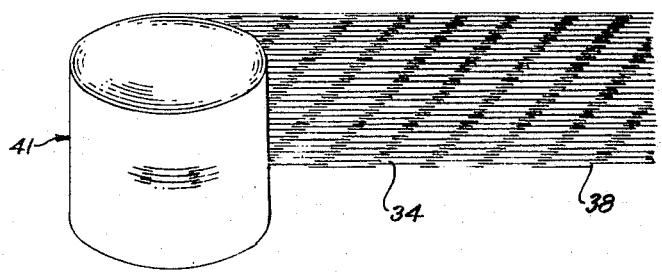
INVENTOR.
LEON O. PARKER

INVENTOR.
LEON O. PARKER
BY
Owen, Wickersham & Erickson
ATTORNEYS

Jan. 24, 1967 L. O. PARKER 3,299,890
SURGICAL BANDAGE, DRESSING AND THE LIKE
Filed June 11, 1963 7 Sheets-Sheet 4
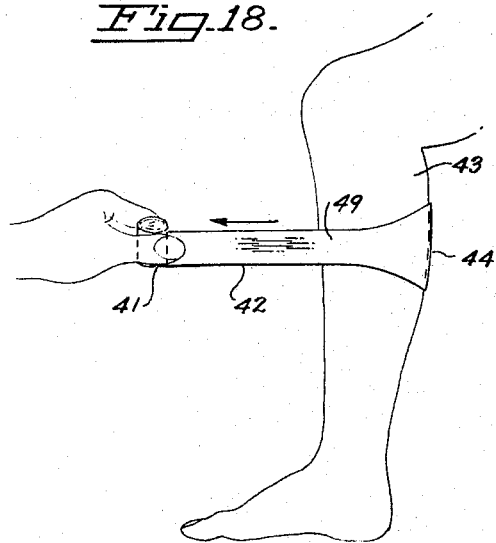
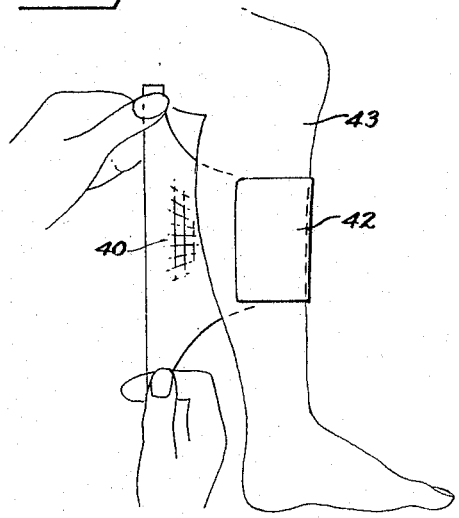
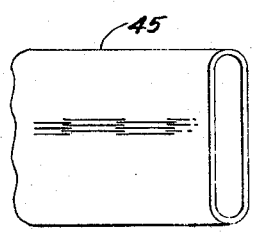
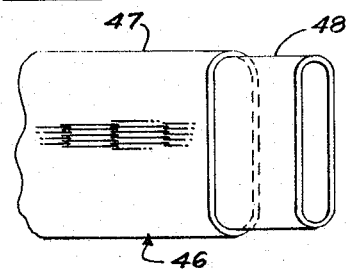
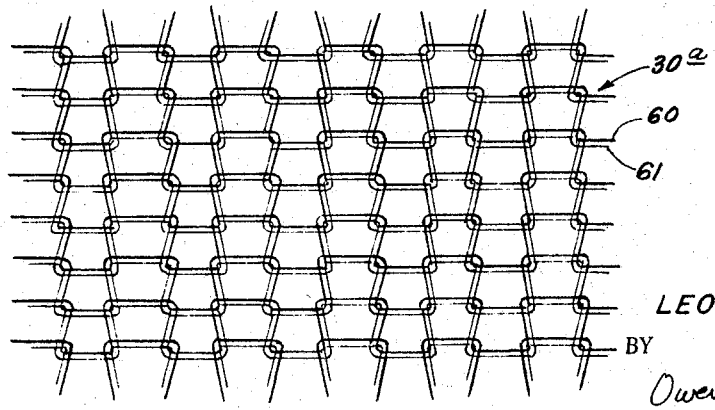
INVENTOR.
LEON O. PARKER
BY
Owen, Wickersham & Erickson
ATTORNEYS

INVENTOR.
LEON O. PARKER
BY
ATTORNEYS

Jan. 24, 1967   L. O. PARKER   3,299,890
SURGICAL BANDAGE, DRESSING AND THE LIKE
Filed June 11, 1963   7 Sheets-Sheet 6

INVENTOR.
LEON O. PARKER
BY
Owen, Wickersham, Erickson
ATTORNEYS

Jan. 24, 1967 L. O. PARKER 3,299,890
SURGICAL BANDAGE, DRESSING AND THE LIKE
Filed June 11, 1963 7 Sheets-Sheet 7

INVENTOR.
LEON O. PARKER
BY
Owen, Wickersham, & Erickson
ATTORNEYS

# United States Patent Office 3,299,890
Patented Jan. 24, 1967

3,299,890
SURGICAL BANDAGE, DRESSING AND THE LIKE
Leon O. Parker, San Francisco, Calif., assignor to San Francisco Research Corporation, San Francisco, Calif., a corporation of California
Filed June 11, 1963, Ser. No. 287,029
48 Claims. (Cl. 128—156)

This invention relates to improved surgical bandages, dressings and the like. More particularly, it relates to bandages and dressings made from cloth which is extensible lengthwise and widthwise with displacement of its threads, and is infinitely variable between a highly porous condition and a substantially nonporous condition. Still more particularly, the invention relates to such materials which have been prestretched in one direction and specially processed to maintain the prestretched or displaced condition, thereby furnishing a wound covering having desirable porosity and manipulative properties. In certain preferred forms the invention contemplates the incorporation of waterproofing properties and the use of plural layers of bandage and dressing materials having the aforementioned characteristics and also having odor eradicating and infectious-agent decontaminating layers or compartments.

The time-honored materials for bandaging and dressing wounds, and for building up surgical dressings, have been woven cloth strips, and these have customarily been marketed in the form of rolled cloth tape or ribbon of various widths and in the form of folded squares or rectangles. However, this conventional cloth has a number of disadvantages, including: (1) failure to conform to the shape of the body part being dressed, (2) a related tendency for the bandage or dressing to slip and dislodge as the body moves under or about it, (3) lack of control by the operator over the porosity of the dressing or bandage other than by selecting fabric materials having a desired porosity, there being no capacity of changing the porosity of the bandage as it is being applied, and (4) inability of such bandages to be removed from the wound without pain and damage to the tissues when the tissues have grown into the meshes or pores of the bandage or when the bandage has stuck to the tissues by coagulation of discharge.

As customarily used, fabric presents a rather rough surface to the wound, and the tissues grow into the spaces between the threads of the bandage or dressing and get damaged when the bandage is removed. Attempts to overcome this roughness by reducing the mesh size in the woven material gave a smoother surface but reduced the passage of wound fluids through it.

The foregoing problems are overcome by the present invention, in which a sheet, ribbon, or tube of cloth that initially is extensible and contractable along its major axes has had the size of its meshes and its flexibility altered by stretching and conditioning to retain it in the stretched position.

For example, I have found that a piece of knitted cloth "set" in the stretched position provides a wound dressing which is relatively smooth and yet has great potential porosity for fluid to drain through during healing, thereby accelerating healing because the newly formed skin is not required to spread over an irregular surface. As a result the new skin is smoother. Such a bandage largely retains the ability to be conformed to the curvature of the body part during application. Furthermore, a joint that has been encircled with this side-stretchable bandage is more freely movable. When applying my new bandage over an uneven or irregular surface, or when the direction of the encirclement of the bandage is being changed, a side stretch or pull may be used on the loose side of the bandage to make it conform to the part without tucks or wrinkles. The bandage may be sold in roll form, and it may be readily applied from the roll to a wound. It may be removed with little or no pain or damage, by lateral stretching in such a way that the potential openings are enlarged, while breaking the dressing loose from the wound. When a plural layer bandage or dressing is desired, the invention provides a knitted tube (or two or more concentric knitted tubes) which is stretched and "set" in a manner similar to the fabric ribbon.

My invention also comprises the use of coarse woven gauze having its meshes closed by what may be called "off-set" stretch. This off-set stretch keeps the threads in the axial or lengthwise dimension parallel to each other but slants the other threads oblique to the major dimensions. This provides a method of opening or closing the meshes and produces a bandage with no stretchability in its lengthwise dimension but with great capacity for widthwise stretch.

Another problem in prior-art dressings is their transmission of odor from the wound and wound discharge, causing discomfort to medical attendants and patients alike. Attempts to overcome this by using impervious materials such as a plastic sheeting or certain papers prevented ventilation of the wound. My invention provides means to overcome this difficulty by a bandage having a plurality of layers with one layer acting as a compartment to catch the wound discharge and another layer acting as a compartment capable of catching or blocking odor, yet the plural-layer bandage lets air pass in freely for ventilation.

Another disadvantage of prior-art dressings was that they spread dangerous contaminated materials when wound discharge soaked through to the surface. Efforts to overcome this by placing fluid barriers such as paper were often fruitless because the fluid soaked through the barrier; also the barrier interfered with ventilation of the wound. With the present invention, this problem may be overcome by a plural-layer prefabricated dressing that provides a compartment near to the wound to absorb and catch the discharge, an air permeable material to deter passage of the fluid drainage to outer layers, and, in addition, a decontaminating layer or compartment away from the wound. This decontaminating layer has germicidal agents to sterilize the discharge before it can reach the surface of the dressing, yet the germicide is separated from the wound.

Other objects and advantages of the invention will appear from the following description of some preferred embodiments thereof.

In the drawings:

FIG. 1 is a plan view of a loosely knit fabric suitable for use in the manufacture of my new surgical bandages and dressings.

FIG. 2 is a plan view of the fabric of FIG. 1 stretched widthwise, showing how it has simultaneously contracted in length with rectangular openings between the threads.

FIG. 3 is a plan view of the fabric of FIG. 1 stretched lengthwise showing how it has simultaneously contracted in width, with triangular openings between the threads.

FIG. 4 is a plan view of woven fabric cut on the bias for use in the manufacture of surgical bandages and dressings according to the invention.

FIG. 5 is a plan view of the fabric of FIG. 4 stretched on the bias in one direction showing how it simultaneously contracts in the transverse direction.

FIG. 6 is a plan view of the fabric of FIG. 4 stretched on the bias in the other direction.

FIG. 7 is a plan view of another woven fabric suitable for use in the manufacture of one form of the invention.

FIG. 8 is a plan view of the fabric of FIG. 7 with the two parallel lengthwise sides offset lengthwise, the threads in the transverse dimension being oblique. The openings between threads become parallelograms with two acute angles and two obtuse angles, and the openings and the surface area are both reduced.

FIG. 9 is a plan view of the fabric in FIG. 7 with the two parallel lengthwise sides off-set in the opposite direction from FIG. 8.

FIG. 10 is a plan view of loosely knitted fabric cut on the bias and suitable for use in the manufacture of one form of the invention.

FIG. 11 is a plan view of the fabric of FIG. 10 stretched on the bias showing how it simultaneously contracts in the transverse direction and how the opening between threads are rectangular.

FIG. 12 is a view in perspective of a bandage roll made from loosely knitted fabric similar to that of FIG. 1, which fabric has been stretched longitudinally as in FIG. 3 and fixed in the stretched condition in accordance with the invention.

FIG. 13 is a view in perspective of a bandage roll made from loosely woven cloth which has been cut on the bias and stretched longitudinally (in a manner similar to FIG. 6) and then fixed in the stretched condition in accordance with the invention.

FIG. 17 is a view in perspective of a bandage roll formed from loosely knit fabric stretched to its maximum in its long axis with off-setting of its two sides with the rows of the knit in an oblique position with respect to the long axis, with the lengthwise threads parallel, with practically closed rectangular openings.

FIG. 18 is a view in perspective showing the application of a bandage of this invention to a patient's leg from a bandage roll like any of those of FIGS. 12, 13, 16, and 17. The widthwise stretch of the bandage is being used to give a more open-mesh dressing in one area while the meshes are more closed in another area.

FIG. 22 is a view in perspective illustrating widthwise stretch of a bandage of this invention during removal from a patient's leg in accordance with the invention.

FIG. 23 is a fragmentary view in perspective of a two-layer bandage of this invention made from a loosely knitted tube which has been stretched longitudinally and fixed in the stretched condition.

FIG. 24 is a fragmentary view in perspective of a multi-layer bandage of this invention formed from concentric knitted tubes which have been stretched longitudinally and fixed in the stretched condition.

FIG. 25 is a fragmentary plan view of an enlarged scale of a cloth loosely knitted from two coextensive strands or threads, one strand being of different fiber than the other, for use in bandages of this invention.

FIG. 27 is a view like FIG. 26 of a fabricated dressing comprising two layers of width-stretchable fabric with a compressible, extensible soft padding material between.

Figure 14:
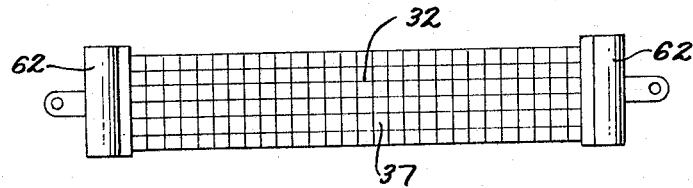
FIG. 14 is a plan view of a section of woven fabric similar to that in FIG. 7 being held at the ends by clamps.

One preferred base material for use in the invention is loosely knitted cloth having sufficiently large mesh to enable considerable stretching in either direction, as illustrated in FIGS. 1, 2, and 3; however, other materials, such as large mesh woven cloth cut on the bias (FIGS. 4, 5, and 6) which is extensible and contractible along the major dimensions, and loosely woven fabric of sufficiently large mesh to permit a substantial amount of off-set stretch as in FIGS. 7, 8 and 9, may be used in some instances.

The extensibility and contractibility of the cloth base can be explained as follows. When a sheet of this material is stretched lengthwise, it gains in length at the expense of a loss in width; when it is stretched widthwise, i.e. in a direction perpendicular to the lengthwise direction it gains in width and loses in length. When a tube of this material is stretched axially, it gains in length at the expense of a loss in diameter and circumference and when it is stretched circumferentially it gains in diameter and circumference and loses in length. In the case of knitted cloth, the extension (with transverse contraction) is accompanied by a sliding of the threads through the loops of the knitting, with a change in the location of the bends along the length of the thread. In the case of bias woven cloth or net the extension-contraction effect is the result of an angular movement of the threads at their intersections, with the intersections remaining at substantially the same points along the length of each thread. In the case of non-bias, loosely woven cloth that has been given an off-set stretch to reduce its width, the contraction in width is likewise due to angular movement of the threads at their intersections, with the intersections remaining at the same points along each thread, but, in this case, the accompanying lengthwise extension is a movement of the longitudinal threads with respect to each other and not a proportional elongation of the entire fabric as occurs when knitted or bias woven goods is stretched.

It must be understood that the stretch referred to above is not mere extension, for there is the corresponding contraction in the direction perpendicular to the direction of pull. In addition to its stretching and contracting capabilities, the base material is such that it can be restored to its original prestretched condition by a second stretching force applied in the direction transverse to the first stretching force. This property is possessed by the aforementioned materials, since when they have been stretched in one direction they can be restored to their former dimensions by a second stretch in the transverse direction. It should be pointed out that the aforementioned stretching is not the result of elongation or stretching of the threads themselves, as in the case of elastic fabrics, but results from a movement of the threads upon each other. However, truly elastic material can be used to some degree, as will be set forth in greater detail later.

Material that gets soggy or mushy when moistened and that tends to act in such a way that once stretched its former dimensions cannot be regained is not suitable for the base material. For example, felt and cotton batting tend to pull apart and to remain so; they do not respond sufficiently to crosswise pull, and they do not regain their original shape. Therefore, they are unsatisfactory for the base material. The additional fact that they do not expand enough without fracture when pulled is itself a fatal defect, but their inability to be conformed by being reduced in size after being pulled out is their more important failure; but these materials may be combined in a dressing of the base cloth materials and stretched, flexed or extended along with them.

Although it may be true that practically any material may be stretched somewhat, in order to practice the present invention a really substantial change in dimensions is required. The base material should be capable of a large reduction in width upon the application of a moderate, properly exerted lengthwise force. Knit materials, and woven or net materials cut on the bias, have marked ability to expand and contract under pull. As a minimum amount the knit and bias cut woven and net materials satisfactory for use as a base should be expandable about 25% in each dimension, as compared with a neutral or midway position. For example, a 4" x 4" sheet of unstretched material would have to be extensible to about 5" x 3" when pulled in one direction and to about 3" x 5" when pulled in the transverse direction. Non-bias, loosely woven material, suitable for use, has the ability to contract 25% or more in width when subjected to an off-set longitudinal pull. For example, a 4" x 24" strip of loosely woven cloth may be made to contract to 3" (or less) in width by exerting a lengthwise pull on opposite edges sufficient to off-set one edge about 2.6" with respect to the other edge, with the strip remaining essentially 2 feet long. Actually, the base may expand and contract much greater than this, but it should not generally be less. If its "neutral" or unstretched position, as originally woven or knit, permits a greater stretch in one direction than in another direction, the maximum stretch in one direction may be less than 25%, so long as there is sufficient stretch in the other direction to make up a substantial equivalent of total stretch.

For purposes of clarity, a base which is suitable, as explained above, will be a loosely constituted thread-type cloth with threads arranged for a substantial amount of contraction along one of its major mutually perpendicular dimensions when an extensive force is suitably applied along the other major dimension. Loosely knit cloth and loosely woven bias cut cloth regularly possess this property when the extensive force is applied to the entire width of the material. Normal (non-bias) loosely woven cloth possesses this property when the extensive force is applied to opposite edges of the material.

Four suitable fabrics are illustrated diagrammatically in FIGS. 1–11. FIGS. 1–3 show a knit fabric 30 that, when stretched in width (FIG. 2), contracts in length, and when stretched in length (FIG. 3), contracts in width. FIGS. 4–6 show a woven fabric 31 cut on the bias. When this woven fabric 31 is stretched on the bias lengthwise or widthwise, it extends in one direction and at the same time contracts in the transverse direction (FIGS. 5 and 6). FIGS. 7–9 show a coarse mesh woven fabric 32 with threads not disposed on the bias and with no capacity for true elongation, unless the threads are elastic, but as is illustrated in FIG. 8, the fabric 32 may have two of its major parallel dimensions off-set with respect to each other yet remaining parallel, thereby producing obliquity of the threads running in the other major dimension and reducing the size of the meshes or interstices 37 and greatly diminishing the width and total surface area of the fabric 32. (In FIG. 9 the off-set is in the opposite direction.) This produces a fabric with small or closed mesh which has the capacity of being opened by extension in the proper dimension but the fabric has no stretch or extension capacity in the other dimension, unless the threads are elastic. FIGS. 10 and 11 illustrate loosely knit fabric 33 cut on the bias. When fabric 33 is stretched in a direction diagonal to that of the knitting (FIG. 11) it likewise extends in the direction of stretch with complementary contraction in the transverse direction. However, in this case (FIG. 11) the threads lie parallel to each other with the interstices or pores 34 rectangular, as compared to the triangularly shaped pores 35 of FIG. 3, and the rectangular pores 34 can be completely closed by sufficiently stretching the fabric 33.

One preferred material is illustrated in FIGS. 1, 2 and 3, namely, a loosely knitted fabric 30 which is cut into strips as by splitting a knitted tube lengthwise or obliquely in a helical fashion or by cutting sections or rings from the tube and dividing them (but this last method produces short pieces compared to the other two methods of cutting). These strips of knitted material, regardless of how cut, may be stretched with extension in one dimension and a corresponding contraction in the dimension normal thereto. When the lengthwise cut material is stretched for extension along its long axis (FIG. 3) the interstices or pores 35 become triangular and cannot be completely closed by stretch-extension alone, but a method to completely close them by off-setting will be described later. When tubular knit material is cut into strips in a helical fashion, there is a bias disposition of the threads in the strips. When this is stretched with extension in the long axis of the strip, the interstices or pores 34 become rectangular as illustrated in FIG. 11 and may be completely closed by maximum extension, thus producing a material with smoothness on one side and great reduction of roughness on the other side and potential pores through it and with a capacity for being stretched and extended in a widthwise dimension to open the pores. I have discovered that loosely knitted open mesh goods can be given substantial smoothness on both sides by closing the meshes with maximum stretch in the oblique dimension or by off-setting in addition to maximum stretching in either major dimension as established by the direction of the knitting. This holds true for both flat and rib knitted coarse mesh goods. When a knitted tube is cut so that the circumference of the tube becomes the long dimension of the bandage, maximum stretch-extension alone closes the meshes and smoothes one side. Both sides can be smoothed by off-setting.

Various knit materials or forms of knitting may be used to make an open mesh, two-way-stretchable bandage, or a closed mesh, one-way-stretchable bandage, the choice depending upon the effect desired. Loose mesh rib knit material when stretched lengthwise of the knitting is relatively smooth on both sides and, for some purposes, may be preferred to flat knit which, unless stretched obliquely or off-set, will have a roughness on one of its two sides.

On the other hand when rib knit material is stretched widthwise of the knitting it has roughened seams on both sides, a condition not usually desired in a bandage but it can be greatly improved by oblique stretch or off-setting.

As an example, one type of knit material which has been found very satisfactory for purposes of this invention is a knitted fabric with nine threads to the inch when in its normal or "rest" condition, i.e. not stretched in either direction, so that the meshes are almost square, as shown at 35 in FIG. 1. When stretched to its maximum length, a given piece 12 inches long may measure about 2 inches in width, and when stretched to its maximum width the 2-inch width may extend to about 30 inches, and the 12-inch dimension may contract to about ¾ inch.

Another material satisfactory for this invention, called "stockinet," is a tubular fabric which may be cut open lengthwise to provide a flat single ribbon or may be used as a flattened tube (as in FIGS. 23 or 24) to provide a plural layer bandage. It may also be cut helically to provide a long strip of the obliquely cut knit fabric shown in FIGS. 10 and 11. It has ten threads to the inch in each direction. When stretched lengthwise to the maximum, it then has 7 threads to the inch along its length and 34 threads to the inch along its width. When stretched widthwise to the maximum, it will have 34 threads to the inch along its length and 7 threads to the inch along its width.

An example of a suitable woven fabric, for use either as the bias-cut fabric illustrated in FIGS. 4–6 or with the off-set stretching procedure illustrated by FIGS. 7–9, is woven gauze which has open meshes larger than the threads, varying from 6 to 18 threads per inch and thread size from 14 to 60.

One of the important features of this invention is the size and shape of the interstices, meshes or pores between the threads or strands of the cloth. As has been set forth, the interstices, meshes or pores may be made to vary from open to closed by stretch-extension as is illustrated in FIGS. 1 to 6 and FIGS. 10 and 11, or by off-set stretch as is illustrated in FIGS. 7, 8 and 9. For example, with a knitted cloth stretched widthwise (FIG. 2) the interstices 35 are substantially rectangular in shape and may be closed by stretching alone; however, if the stretch is in the lengthwise direction (FIG. 3), the interstices 35 are generally triangular in shape and cannot be closed by stretch-extension alone, but they may be closed by adding the process of off-setting. When the same knitted cloth is stretched to the maximum in either direction, the threads or strands of the cloth lie closely adjacent or in contact, thus leaving one side with a substantially smooth surface.

In the case of knit cotton goods, softening by moisture and heat before stretch is exerted tends to improve the ability of the threads to lie in closer proximity. The meshes may be closed tighter with firmer contact of the threads of the knit goods if there is an obliquity to the rows of loops in the knitting which pass, in general, in a dimension perpendicular to the stretching.

The triangular pores of the lengthwise stretched knitted fabric illustrated in FIG. 3 can be closed by the use of off-set similar to that illustrated in FIGS. 7, 8 and 9 for woven fabric.

With woven or net cloth cut on the bias, a different condition prevails. When either of these two materials is stretched to the maximum, lengthwise or widthwise, the strands or threads tend to lie in a totally abutting position so that the interstices or meshes 37 of the material can be said to be "closed." On the other hand, when the stretch is less than the maximum, the interstices 37 will be more "open," and the material will be more porous. (See FIGS. 4, 5 and 6.)

FIGS. 7, 8 and 9 illustrate the changing of meshes 37 from open to closed in a straight-cut woven fabric or net by off-setting of parallel sides. The off-setting produces pores quite similar to the oblique stretching of the bias-cut woven fabrics illustrated in FIGS. 4–6.

In accordance with the invention, to produce a width-stretchable closed or small mesh bandage or dressing, an elongated strip of a base material selected according to the foregoing principles is stretched or off-set substantially to its maximum extent in a chosen direction (thus completely or incompletely closing the meshes depending upon the material selected and the direction of the exerted stretch) and processed so as to condition it to retain the stretched or off-set state, thereby providing a bandage which may be pulled lengthwise without substantial stretching or "give" but which can be expanded by lateral force to open the meshes, as illustrated in FIGS. 18, 19, 20 and 22.

Figure 20:
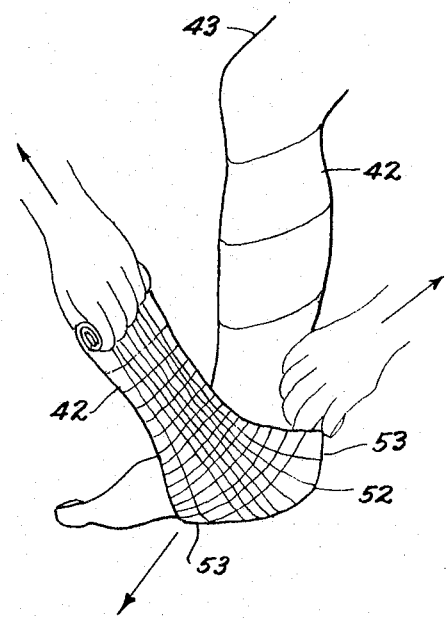
FIG. 20 is a view in perspective showing the application of a bandage of this invention to a patient's leg from a bandage roll like any of those of FIGS. 12, 13, and 17. The bandage conforms about the heel with widthwise stretch of the bandage on each side where it passes behind the heel.
Figure 21:
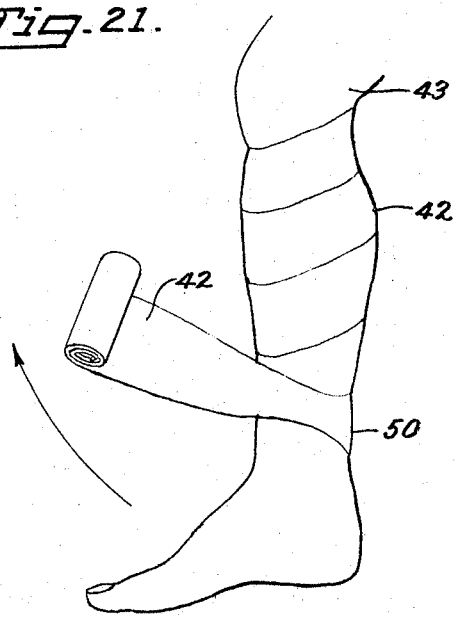
FIG. 21 is a view in perspective showing the application to a patient's leg from a bandage roll like those of FIGS. 12 and 13. Tucks and wrinkles are eliminated by lengthwise stretch of the bandage when a change of direction is made in the bandaging spiral.

If, instead of a closed mesh bandage which is substantially non-extendible lengthwise, a more open mesh bandage is desired having a restricted longitudinal give, a base material according to the foregoing principles (FIGS. 1–6) is selected and is cut into an elongated section and stretched less than its maximum in the lengthwise dimension and is conditioned to that state. This produces a bandage or dressing similar to those illustrated in FIGS. 12 and 13 having comparatively open meshes 35 and 37 and capacity for some lengthwise stretch with adequate widthwise stretch-extension for the purposes illustrated in FIGS. 18, 19, 20 and 22. This form of bandage, having some lengthwise flexibility, is helpful in fitting irregular contours or in changing the direction of the bandage, as illustrated in FIG. 21. The more open meshes of this form of bandage are likewise advantageous in some situations.

Figure 15:
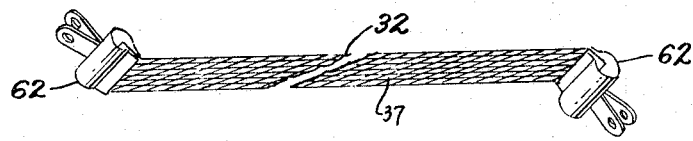
FIG. 15 is a view in perspective of the device in FIG. 14 with the clamps swung around so as to produce off-set in the fabric similar to FIG. 8.
Figure 16:
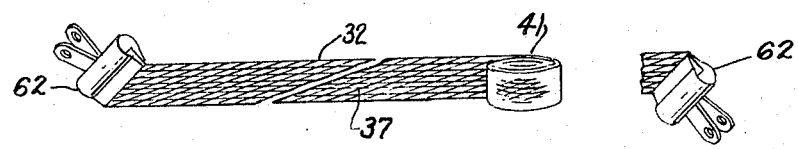
FIG. 16 is a view in perspective showing the device of FIG. 15 with the fabric cut near one clamp and the cut end partially rolled into a bandage roll.

A bandage or dressing having substantially no lengthwise capability of stretch, but having considerable widthwise expansion in response to a laterally applied force, with either closed or more open meshes may be made from the fabric illustrated in FIGS. 7–9. For this purpose, a woven fabric with large meshes but without bias cut (FIG. 7) is selected and cut into an elongated strip and the edges of the strip off-set as in FIGS. 8 or 9. An example of a method of producing such off-set is illustrated in FIGS. 14–16, wherein clamps 62 are attached to each end of the strip 32 as is illustrated in FIG. 14. The clamps 62 are then rotated with tension maintained on the strip as shown in FIG. 15 to off-set the two sides of the strip with respect to each other, producing obliquity in the filling threads which run widthwise of the fabric. Depending on the amount of rotation given the clamps 62, the meshes 37 may be incompletely or completely closed, as desired, and the fabric conditioned to maintain the mesh size. The treated strip may then be rolled in the off-set condition (FIG. 16). Very open mesh woven goods with 8 threads per inch will give a closed mesh dressing or bandage that has elongated slits between the threads, which make potential drainge spaces for fluids to pass, yet it has a surface which is quite smooth on both sides. Although this form of bandage has no lengthwise capability of stretch, it responds excellently to force for a widthwise stretch to open the meshes for the purpose of placing a more open mesh dressing over one area with a more closed mesh in another area, or to open the meshes in order to aid in removal of the dressing, or for some accommodation to irregularities.

An example of production of a preferred closed mesh bandage or dressing with widthwise stretch is as follows: An elongated section of coarse-mesh knit fabric is cut as by splitting an elongated knit tube, and the fabric is moistened in hot water (150° F.) and placed in two clamps, one at each end. The two clamps are pulled apart until maximum stretch is obtained in the section of fabric, and while maintaining the stretch, the clamps are rotated, in a manner somewhat similar to that shown for the woven cloth 32 in FIG. 15, to off-set the two sides. This will close the triangular meshes produced by stretch alone.

The section of maximum stretched off-set fabric is then conditioned to fix the meshes by subjecting it to air heat of 300° F. for 15 minutes while stretch is maintained. The clamps are then removed and the fabric rolled into a bandage roll as illustrated in FIG. 17. The meshes 34 will be closed, and the loops of the knit 38 will run in a diagonal or oblique direction across the bandage. Due to the hot water processing prior to stretching, this bandage will have no further lengthwise stretch but it will have excellent widthwise stretch with a closed mesh, and it has one smooth side with little roughness on the other side. It may be further treated with waterproofing or wetting agents. In the foregoing example the omission of the off-setting (by not rotating the clamp) will produce an open small triangular mesh bandage which has no lengthwise and great widthwise stretch capacity.

Thus far the description has concerned primarily fabrics made of threads which possess little or no elasticity, but it should be understood that fabrics made of threads which are extensible with or without complete elastic recoil can be used within limits for the purposes of the invention. A fabric made of extensible threads can be processed similarly to those with non-extensible threads, especially if the elastic limits are small, e.g., up to 15%. Suitable threads with limited elasticity are now marketed, made from various synthetics, e.g., Lycra (Du Pont Company) and polyethylene. Many of these synethic fabrics are by nature water repellent, an important feature in certain situations.

The fabric may be fixed in the stretched or off-set position in a number of ways. In case of cotton goods, the material may be dampened or wet slightly and stretched and then ironed with a hand iron or mangle. Alternatively, the stretched wet goods may be exposed to air heat at a temperature of 260° to 300° F. for about 15 minutes. The conditioning may be substantially improved by the addition of sizing to the cotton fibers. For example, the cotton fabric may be washed in a solution of one or two parts of polyvinyl acetate emulsion in 100 parts of water before it is subjected to the stretch and the heat or ironing procedure. Various sizing agents are suitable, an amount being used in some cases sufficient to stiffen the threads without producing any substantial adhesion of the threads to each other, while in other cases sufficient amounts are used to cause some adhesions at the junctures of the threads. The synthetic polymers in small-particle emulsions, when so applied, enter the surface of the cotton or cellulose fibers and are somewhat affixed therein, so that they are not washed away as rapidly as those particles on the surface. The fabric is preferably treated with the emulsion for at least one hour, washed temporarily with plain water, and then dried. The deep particles are affixed by the drying and act as a stiffening yet do not form a coating to adhere to the outside of the fiber. This stiffening is temporarily eliminated for the stretching operation by applying heat and moisture, with the stiffness returning when the fabric is dried.

When the cloth is made of synthetic fibers such as nylon, orlon, dacron, Lycra, polyethylene, etc., heat processing at 100° to 150° F. while the cloth is being stretched, conditions the strands for easier stretching. In the stretched state the goods may be passed through a heat mangle or hand ironed, or heat may be applied by hot air or steam under pressure, usually at 300° F. for about 15 to 20 minutes, varying according to the nature of the synthetic material and the size of the thread.

The purpose of the conditioning is to give a more or less permanent set to the convolutions of the threads or strands as they lie in the stretched or off-set position of the fabric. In the case of knitted goods, the threads have sharp "bends" where each loop of thread engages the next course of thread of the knitting (as at 38 in FIG. 3). Upon conditioning, these bends remain in the thread, and the threads continue to engage each other at these points until force is applied to the cloth sufficient to overcome the stiffness of the threads and dislodge the stiffened "bends"; and, after being dislodged, the stiffened bends exert a recoil producing some elasticity to the bandage. With these bandages of knitted material it is possible, if desired, in the manufacturing process to stretch to extend the strip of material somewhat less than its maximum and to sufficiently stiffen them by the conditioning to provide a two-way stretchable bandage. A similar, but somewhat less intense, situation occurs with bias-woven fabrics, wherein the threads are only mildly bent and, upon stretching the woven fabric, the gentle bends remain at the same location in the thread but change their form somewhat to accommodate the change in angle of the threads (as at 39 in FIG. 6). Accordingly, with bias woven cloth, the conditioning is much less effective in holding the stretched condition of the cloth. For this reason, knitted cloth is preferred to bias woven cloth in a number of uses for my novel bandage.

In the case of woven cloth not cut on the bias but with mesh size regulated by the off-setting illustrated in FIG. 16, the meshes are not charged or disturbed by lengthwise pull on the bandage, but the meshes may be opened by widthwise stretch.

With cloth fabricated from synthetic fibers, heating alone at the proper temperature is usually sufficient to produce the desired set to the threads. However, the threads of natural fibers such as cotton are considerably softer and more flexible and, accordingly, the addition of sizing to cotton fabrics is recommended to add resiliency to the threads. In this connection it should be noted that the sizing is used primarily to stiffen the threads so they will better retain the set produced by the ironing, although the sizing may in some instances provide adhesion of the threads at their junctures.

After the fabric is stretched to the desired extent and fixed in the stretched condition by sizing and ironing in accordance with the foregoing principles, it may be protected for storage and/or shipping by winding into a roll, as in FIGS. 12, 13, 16, 17, and 30. (See numeral 41 in FIGS. 12, 13, 16 and 17 and numeral 56 in FIG. 30.)

Figure 29:
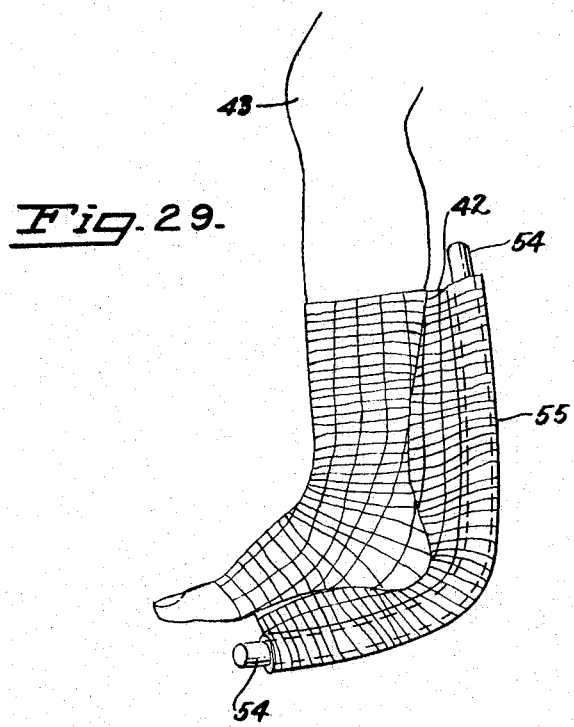
FIG. 29 is a view in perspective of a bandage of this invention being applied to a leg from a flexible bandage roll.

My novel bandage has improved features which permit its application in greater width than conventional bandages. In some cases the bandage roll can be of sufficient width to cover an entire extremity of the body with each encirclement. I have discovered that the bandage roll itself can be made flexible so that these wide bandages can be applied easily over a complex area such as the ankle or a fixed elbow. Rolls of side-stretch-extendable bandage do not resist flexing like rolls of conventional bandages, and the flexibility is retained if the bandage is rolled on a flexible core. The flexible core may be cardboard, plastic or metal, or a combination of these. Both plastic and metal can give a recoverable flexibility desirable in some cases. FIG. 29 illustrates application of a bandage from my novel flexible bandage roll, where a bandage roll 55 with a core 54 has been flexed in one position during encirclement of a body part 43 to keep tension on the bandage 42.

The widthwise stretchable or extendable bandage provides new and valuable factors when concentrically wound into a bandage roll. Such a roll may be stretched so as to widen the bandage. Coarse mesh knitted cloth in a closed-mesh widthwise-stretchable bandage can be made into a bandage roll, which may be stretched to double its width and thereby the bandage is made to be twice as wide. Coarse-mesh woven fabric cut on the bias wound into a bandage roll can be stretched but to a lesser amount than knitted goods. In the case of knitted goods, or woven goods cut on the bias, made into closed mesh bandages and rolled into a bandage roll, the circumference of the roll is decreased when it is elongated by stretch. There is a decrease in the length of the bandage with the elongation of the roll axially. For this reason the roll must either be loosely wound or have an open center or compressible core within it.

Figure 30:
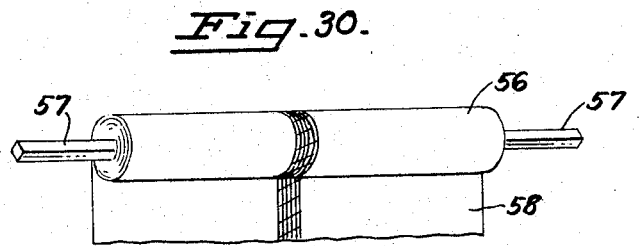
FIG. 30 is a view in perspective of a bandage roll formed of widthwise extendable bandage concentrically wound on a folded compressible core.

FIG. 30 illustrates a stretchable bandage roll where a side-stretchable bandage 58 made from coarse mesh knit fabric, or coarse mesh woven fabric cut on the bias, is rolled into a concentric bandage roll 56 on a compressible core 57. Suitable compressible cores are obtained by folding a strip of fiberboard or plastic.

Figure 31:
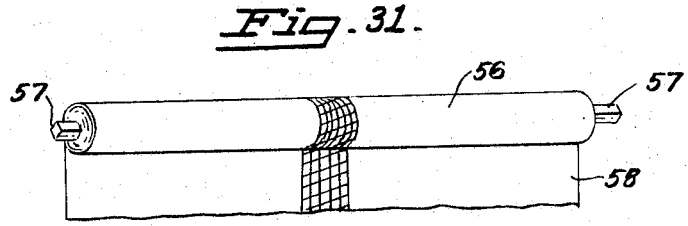
FIG. 31 is a view in perspective of the bandage roll of FIG. 30 stretched along the axis of the roll, with a corresponding increase of the bandage widthwise and a reduction in the circumference of the bandage roll.

FIG. 31 illustrates the bandage roll of FIG. 30 being elongated axially by stretching the bandage roll 56 becoming elongated and smaller in circumference with the inner core 57 compressed and the bandage 58 widened. The bandage roll of FIG. 30 may be stretched more in one area than another. The middle portion of the bandage only may be stretched, in which case the middle of the bandage roll will be less in circumference, and the bandage can then be applied more evenly over an object that is smaller in its middle. The bandage roll may be stretched at one end only, in which case the stretched portion may be applied over the smaller end of an object to fit more evenly. Only width-stretchable bandages made of knit fabric or woven fabric cut on the bias are shortened by elongation of the roll. This shortening in one portion of the bandage aids in even fitting of objects that are smaller in one area than another.

Bandage rolls made of woven fabric not cut on the bias, but made width-stretchable by off-setting, are stretchable for elongation axially, which gives a wider bandage but there is no shortening in the bandage from the elongation of the roll and elongation of any portion of the roll has no effect in fitting uneven objects.

Instead of packaging in rolls, bandage material made in accordance with the foregoing may be cut (or otherwise formed) into smaller pieces, rectangles, squares, or otherwise, and protected in a package laid flat against a semi-rigid surface.

Knit or woven colth stretched so that the interstices are "closed" or elongated toward closure have been found to be highly suitable for surgical dressings and bandages, particularly where freedom of movement in the body part is desired. If, for instance, a length of knitted cloth is completely stretched in one direction and applied to a body joint, it will stop motion in the direction of the stretch, yet will permit motion in the transverse direction. This is very useful in applying dressings over body joints where motion must not be restricted.

For surgical dressings where there is considerable drainage, the meshes should not be completely closed, and the triangular mesh 35 obtained from longitudinal stretch of knitted cloth is ideal (FIGS. 3 and 12). In this case, the cloth should be stretched without any obliquity, and stretch completed before the meshes are entirely closed. It should then be conditioned so as to maintain its mesh form until the time of use. In other surgical dressings in which drainage is not copious and skin is being encouraged to grow, a closed mesh with only potential openings is desirable, as in FIG. 17.

Some of the advantages of my novel bandage are illustrated in FIG. 18, wherein is shown a bandage 42 being applied to a patient's leg 43. The prestretched condition of the bandage permits the use of some tension in application, and side-stretch may be used to widen and open the meshes in one area 44, but leave the meshes closed in an area 49. The area 44 has an open mesh for free drainage but the area 49 has a closed mesh with a smooth surface next to the tissues. The closed mesh still has a long potential pore permitting some drainage of fluids.

My novel bandage will have some valuable elasticity when made of base fabrics that have some elastic stretching capacity, but the open mesh bandage has additional useful capacity for being further stretched in the lengthwise dimension by use of tension in application (FIG. 21) where the bandage 42 is applied to the leg 43 in a downward spiral without much tension or extension in length or contraction in width of the bandage, but at point 50 the direction of downward spiral is changed upward and more tension is applied to the bandage, producing more narrowing and more lengthwise stretch on the lower side than on the upper side, thereby tending to even the tension across the bandage and eliminate wrinkles and tucks.

Figure 19:
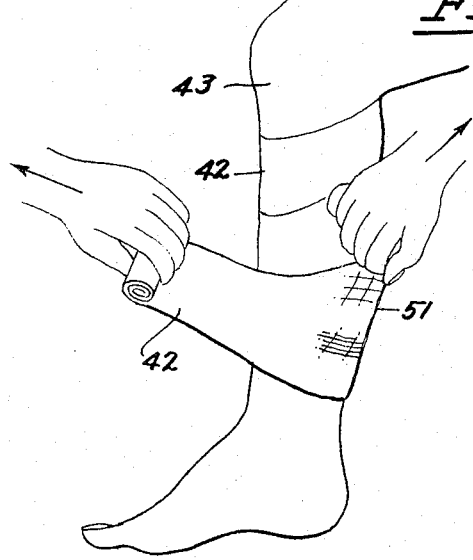
FIG. 19 is a view in perspective showing the application of a bandage of this invention to a patient's leg from a bandage roll like any of those of FIGS. 12, 13, and 17. Here, the widthwise stretch of the bandage is used to give conformation without tucks when the direction of the bandage is acutely changed.

A further useful feature in my novel bandage is the width-stretch illustrated in FIG. 19, where the bandage 42 is applied to the leg 43 in a downward spiral in the first encirclements but, in starting an upward spiral, the bandage is widthwise-stretched on its upper side at point 51, thus avoiding wrinkles or tucks and evening the tension on the two edges of the bandage. A further valuable feature of this side-stretch capacity is illustrated in FIG. 20 where the bandage 42 is applied over the upper leg 43 and passed down to the heel 52, where it is made to more evenly fit over this protuberance by side-stretch on the two borders 53 of the bandage just as it is applied to that area. The meshes in the edges 53 of the bandage are opened quite wide, whereas they are not opened at the middle of the bandage.

A great advantage of my novel-prepared widthwise-stretchable bandage over conventional bandages is illustrated in FIG. 22, which shows the removal of the bandage. For removal, my bandage 42 can be given a side stretch which causes the meshes to open (as at 40) and the threads to slide, shearing the threads away from the wound one at a time tangentially (rather than pulling them away in mass perpendicularly, as is necessary with the conventional type of bandage), thereby releasing the adhesion without direct pull on the skin or scab. The ability to remove the bandage in this manner practically eliminates the usual discomfort to the patient, and, of more importance, little or no damage is done to the newly healed, or healing, tissues.

Another advantage of my novel bandage over conventional bandages is the wide area that can be covered with each wrap or encirclement. This eliminates joiners and overlaps, which tend to slip out of place with motion and give uneven tension so common in narrow conventional bandages.

Another advantage of my novel bandage over conventional bandages is its lack of limitation of joint motion when a joint is wrapped or encircled with it. The widthwise-extension potential permits joint motion without slippage of the bandage.

In certain of my novel bandages there is the added advantage of limited elasticity which, after its application, keeps contracting and compressing the tissues to reduce swelling until the limit of recoil is reached. This limited elastic recoil is an improvement over conventional elastic bandages, which are difficult to apply without a damaging amount of elastic recoil being present. This limited elasticity is obtained in any of three ways: First, the bandage may be made from an elastic fabric which is totally made of threads which have a limited elasticity. Secondly, it may be made of a knit fabric which has two strands, one non-elastic, the other elastic. Thirdly, knit goods which have been conditioned with the convolutions of its loops in one position become a little elastic when pulled out of the fixed position of the convolutions.

My novel stretchable bandage roll has several advantages over conventional bandage rolls. Through the length-adjustability at the time of application it may be stretched to make a wider bandage to cover a wider area, or it may be stretched in some certain portion of the bandage roll to cause the bandage to more accurately fit a limb which is smaller in the area over which the elongated portion of the roll will be applied.

My novel flexible bandage roll is a valuable adjunct in the application of width-stretch bandages. It aids in keeping uniform tension when the bandage is being applied over a bent body part such as the ankle or the flexed elbow.

An embodiment of the invention, advantageous in certain applications, is illustrated in FIG. 23 wherein is shown a two-layer bandage formed from a knitted tube 45 which has been prestretched in a longitudinal direction, materially closing the meshes, and processed to maintain the stretched condition in a manner similar to that described herein for a single layer bandage. This produces a two-layer ribbon, particularly useful where a thicker bandage is needed. The ribbon may be rolled into a roll 41 similar to those illustrated in FIGS. 12, 13 and 17. If more layers are desired, a multi-layer bandage may be formed from concentric knitted tubes, which have been similarly prestretched and processed. FIG. 24 illustrates such a four-layer bandage 46. In such a multi-layer bandage, the tubes 47 and 48 need not be equally prestretched. If the inner tube 48 is stretched more than the outer tube 47, the composite will have lengthwise rigidity provided by the inner tube 48, with the somewhat open pores of the outside tube 47 on the surface of the composite. Conversely, if the outer tube 47 is stretched more, the surface pores of the composite bandage will have closed pores, with an inner "padding" of more open (and more absorptive) material.

In preparing bandages of this invention, it may be desirable to knit a base fabric 30a from two strands 60 and 61 of thread of dissimilar properties, as shown in FIG. 25. In this manner various useful composite effects may be obtained. As an example, if one thread 60 is cotton and the other thread 61 is a synthetic fiber such as nylon, different flexibility is obtained as well as different capillary action (permitting less or more discharge from wounds through the interstices of the mesh). The cotton strand 60 is advantageous in having greater porosity, while the synthetic strand 61 provides greater strength than can be obtained from cotton alone. The smooth surface of the synthetic thread 61 provides excellent flexibility for contracting or expanding the knit cloth, while being readily set in the extended condition. In such two-strand knit fabric, the synthetic strand may be conditioned by the heat process to produce loops fixed in the bandage that will not be affected or weakened by moisture, as the convolutions in the loops of the cotton threads might be. Therefore, such a bandage holds its tension because of its synthetic strands, with the cotton threads adding other valuable advantages.

As another example, if one strand 60 is an elastic thread and the other strand 61 is relatively non-elastic, the bandage will have enhanced elasticity while still retaining the important property of any stretch in one direction being accompanied by a corresponding transverse contraction. This property provides an elastic bandage much less likely to wrinkle or detach than a bandage composed of elastic alone. If desired, one strand 60 may be more loosely woven than the other 61, yielding a composite having any desired flexibility.

In addition to the procedures heretofore set forth to produce a bandage or dressing which has improved mechanical features such as meshes or pores with varying sizes and shapes and which are openable by widthwise stretch and special extension qualities useful in obtaining a contour fit, etc., other valuable new qualities are added through the application of waterproofing on the one hand or application of wetting agents on the other hand. Waterproofing may be furnished over the entire layer of the fabric or may be only on one side of it while the other side may be treated with the wetting agent, or the entire layer may be treated with a wetting agent. An example of the application of waterproofing is as follows: A section of the novel bandage, as has been described, is selected and placed in clamps to maintain the stretch and is saturated with a liquid carrying the waterproofing agent. The bandage is then exposed to air and/or heat to evaporate the carrying fluid, leaving the waterproofing attached. This produces a complete covering of the bandage with the waterproofing. The pores may be open or closed; in either case the waterproofing tends to block passage of tissue discharge but air can still circulate. Such a waterproofed layer used deep in a multiple-layer dressing permits passage of air but discourages passage of wound discharge. If it is used on the surface of the dressing it will deter the soaking in of fluids that contact the outside of the dressing. Furthermore, this material used next to the wound acts as a release to prevent the tissues from adhering to the dressing and causes less damage to the wound on removal of the dressing.

To produce a one-sided waterproofed bandage, a closed or small mesh bandage is selected from my novel bandages and a section is placed in clamps to maintain the stretch while one side of the bandage is lightly sprayed with an oil-type liquid carrying the waterproofing and the other side is simultaneously heavily sprayed with water; then the liquids are evaporated. This procedure places the oil-type liquid with waterproofing on one side of the bandage but the water soaks in first to prevent the waterproofing from being applied in the pores. Such a bandage has a release to prevent its adhering to the tissues on one side but the pores are capable of conducting fluids or discharge from the wound. The water-carrying capacity of the pores can be enhanced by using a wetting agent in the water.

The treatment of my novel bandage with a wetting agent alone is illustrated by the following example: A section of bandage is selected and placed in clamps to maintain the stretch an dis saturated with a 1% aqueous solution of wetting agent, such as Ivory Liquid (Procter and Gamble). Then the fabric is washed for ten minutes in clear water to remove the excess detergent and dried by evaporation. This renders my novel porous bandage more capable of conducting fluid discharge and, if placed near the layer adjacent to the wound, facilitates the passage of fluid discharge away from the wound.

Waterproofing preparations suitable for my invention are: (1) Quillon (Du Pont Chemical Company), 7% in water for cotton and cellulosic fabrics. (2) Quillon, 7 parts with polyvinyl acetate emulsion (Borden Chemical Company #529) 25 parts and 100 parts of water for synthetic plastic fabrics. (3) Mineral-spirit-soluble polyethylene (Barrett Chemical Company), 20 parts in 100 parts mineral spirits at 200° F. (4) Silicone water-repellent composition (Dow Chemical Company), 25% in mineral spirits (must be heated to 300° F. to affix waterproofing to fabric). (5) Paraffin six parts, mineral spirits 100 parts. (6) Petroleum jelly 15 parts, mineral spirits 100 parts. A suitable wetting agent is Ivory Liquid (Procter and Gamble Co.).

The novel bandages or dressings produced as heretofore set forth are particularly adapted to be combined with each other and especially with other materials into fabricated plural-layer dressings which have additional novel and useful features, at the same time retaining the special features that have been set forth heretofore. Conventional multiple layer dressings have been designed to serve the three following general purposes: (1) To catch drainage from the wound. (2) To protect the wound from outside damage. (3) To exert compression forces by the resiliency in the dressing. One side of these dressings may be especially designed to be in contact with the tissues.

The time-honored materials for catching the drainage are loose, coarse mesh, cotton gauze, loose cotton, and cellulose which is porous, compressible, and absorbent. Usually these dressings have a layer to act as a fluid barrier to prevent the discharge from soaking through to the surface. This layer usually acts not only as a barrier to fluids but as a barrier to air, preventing proper ventilation of the wound.

A plural-layer dressing in accordance with this phase of the invention has a special layer next to the tissues, made of one of my hereinbefore described novel fabric materials having special mesh, release, and stretch qualities. Over and lightly attached to this fabric layer is placed a layer of soft, resilient, absorbent, and extensible material which may be called a filler and which can extend along with the fabric layer when force is applied either to open or to further close the meshes or to make it conform in application. Additional layers of fabric and filler material may be added if these have similar stretch or extensible qualities and are placed in the combination fabricated dressing in proper manner so the stretch-extension factors are similar in all the layers. Although the layers of fabric must have the same stretch-extension qualities, they may have other different characteristics such as waterproofing or they may be treated with a wetting agent. The filler or absorbent layers must have the ability to conform to the stretch-extension of the fabric layers and may also provide different and new factors such as odor-proofing and sanitizing.

Figure 26:
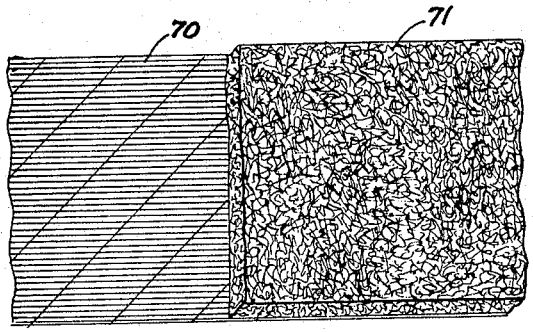
FIG. 26 is a fragmentary view in perspective, partially cut away, of a side-stretchable bandage as in FIGS. 12, 13, 16 and 17 combined with other extensible material.

An example of the production of one of my novel fabricated plural-layer dressings is as follows: For a base layer to go next to the tissues a section of the hereinbefore described bandage material is selected and placed on a flat surface. A like sized piece of cotton batting composed of 85% lint and 15% staple cotton, one-eighth to one inch thick, is lightly sprayed on one side with one part polyvinyl acetate emulsion (Polyco #529, Borden Chemical Company) and 20 parts water. The spray moistened side of the batting is placed on the fabric and pressed against it. The moisture is then permitted to evaporate, whereupon the two layers are lightly adhered to each other. FIG. 26 illustrates such a plural-layer fabricated dressing where the padding 71 is shown as cut away exposing the base fabric layer 70, which has a widthwise stretch capacity. The batting layer 71, being material extensible in both dimensions, will be carried along with widthwise force; thus the entire dressing is widthwise stretchable as a unit.

Figure 27:
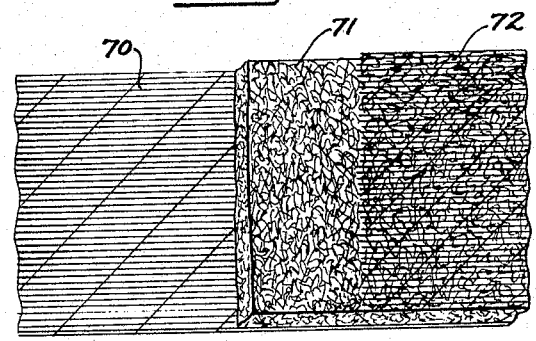

A second example of my plural-layer fabricated dressing has a widthwise-stretchable bandage layer on both sides of the cotton batting layer as illustrated in FIG. 27. It may be produced by lightly spraying the exposed side of the batting 71 of FIG. 26 with the same polyvinyl acetate mixture and placing a second fabric layer 72 on it so arranged that it will have similar widthwise stretch capacity as fabric layer 70 and then pressed against the batting 71 and dried. FIG. 27 illustrates the two fabric layers 70 and 72 with the filler or padding 71 sandwiched between them. This likewise produces a dressing with widthwise stretch capacity.

Figure 28:
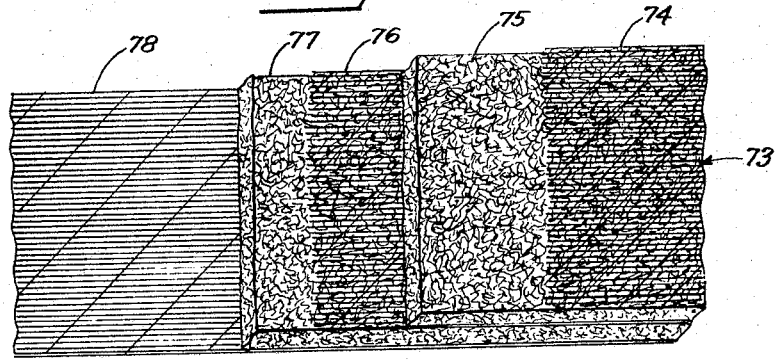
FIG. 28 is a view like FIG. 26 of a dressing comprising three layers of width-stretchable fabric with two layers of compressible, extensible soft padding between the fabric layers.

In a third example of a fabricated plural-layer dressing there are three separate layers of fabric between which are two layers of batting or filler as in FIG. 28. Like the foregoing two examples, the layers are built up with the stretch quality similar in all layers and they are lightly adhered together and the entire fabricated dressing responds to stretch or extension similar to the individual fabric layers. This novel fabricated multiple layer dressing retains all the special mechanical features in the novel fabricated bandages or dressings, namely, special stretch qualities and special mesh or pore qualities which are changeable by stretch, and, in addition, it may contain three new and useful features: (1) A water blocking barrier which does not block the passage of air; (2) an odor blocking layer or compartment which does not block air; and (3) a decontaminating layer which sterilizes any wound discharge before it reaches the outside surface of the dressing. FIG. 28 illustrates such a full thickness fabricated multiple layer dressing 73, with its layers shown as cut away to disclose the layers beneath. The dressing 73 comprises an outer fabric layer 74, next thereunder an outer batting or filler layer 75, a center fabric layer 76, then a deep filler layer 77, and then a deep fabric layer 78 intended to be applied next to the tissues. Base layer 78 is selected from any fabric designed for side stretch with mesh characteristics capable of being changed to suit a given situation. Batting layer 77 is designed to absorb and disperse tissue fluids that pass through the base layer 78 from the tissues. The central fabric layer 76 is waterproofed but is sufficiently open meshed to permit the passage of air for ventilation. The waterproofing is not intended to totally block the fluid but to deter it greatly. Central layer 76 being likewise capable of widthwise stretch does not interfere with the stretch of the entire dressing 73. The outer batting or filler layer 75 is supplied with odor adsorbing materials and/or sanitizing or sterilizing agents. To make layer 75 odor-blocking, the porous batting is combined with many finely divided particles such as activated charcoal (new charcoal which has been kept away from gases that fill its adsorbing capacities) or other adsorbing materials. The batting 75 may be combined with the finely divided charcoal powder by sprinkling the powder on the loose batting and jarring or blowing it into the deeper surfaces. The batting may contain from 10 to 50% charcoal by weight. Finely divided silicon compounds may be adhered to the cotton fibers or to cellulose fibers such as paper pulp mixed through the batting. The sterilizing properties may be given to the layer 75 by incorporating in it bactericidal materials which will dissolve in the wound discharge and sterilize it after it passes through the waterproofed layer and before it reaches surface fabric layer 74. Suitable bactericidal agents are found among the cationic surfactants which are derivatives of quaternary ammonia. These chemicals may be applied to the batting 75 in solution and the batting dried, whereupon they adhere to the surface of the cellulose in the batting layer. Discharge from the wound that enters the thus treated layer 75 is permeated by the bactericidal molecules and thereby decontaminated. A suitable agent is the common surgical sterilizing preparation Zephiran (Winthrop Pharmaceutical Company), 1% to 4% in water. The addition of 0.2% Downey fabric softener (Procter and Gamble) prevents packing of cotton based batting layers during the wetting and drying. The odor-proofing materials require that these dressings be sealed in an essentially air-tight package to prevent the loss of the gas absorbing qualities. The outer widthwise stretchable fabric layer 74 of the dressing may have waterproofed qualities to deter the passage of discharge from the deeper layers to the surface, as well as to deter any water that may get on the surface from going into the dressing.

My novel multiple layer fabricated odor-proofed and sanitized dressing has the advantageous capacity at the time of application that it can be made readily to conform to irregular surfaces and can have its pore sizes changed. It has the further advantage of ventilating the wound yet catching wound discharge in a special compartment and sterilizing it before it reaches the surface to contaminate with dangerous germs. It has another advantage in its capacity to control noxious odors commonly generated in wounds and their discharge.

In preparing the plural-layer dressings described above in connection with FIGS. 26, 27, and 28, it is not essential for all purposes that the batting layer extend the full width of the fabric cloth bandage layer. In fact, the knitted, the bias woven, and the off-set woven fabric bandage materials of the invention are excellently suited for use with narrower fillers when desired, since the stretch ability of the cloth permits it to readily conform to the surface irregularity presented by the narrower batting layer.

To those skilled in the art, various modifications will suggest themselves, all within the scope of the invention. For example, other forms of weaving (or plaiting) than the specific examples given will give suitable coarse cloth having the desired two-way complementary stretch, a "chicken wire" form of weave being one such possible form. Similarly, various sizings may be used to set the prestretched mesh in the extended condition. As a further example, the stretching operation could be dispensed with by knitting, weaving, or otherwise fabricating the cloth in the extended condition, without departing from the spirit of the invention.

I claim:

1. A non-adhesive surgical bandage having firmness and closed-mesh characteristics similar to a closely-woven cloth bandage during application while enabling lateral expansion to open the meshes and to provide shearing action during removal, and consisting essentially of an adhesive-free thread-type cloth fabric having numerous thread intersections, the threads being arranged to enable at least 25% extension in one dimension by movement of the threads at said intersections relative to each other with complementary contraction in its transverse dimension, extended to substantially its maximum length with threads drawn together substantially closing the meshes, and means retaining said fabric in its extended closed-mesh condition against self-recovery therefrom by the conformation and stiffness of the intersecting threads, the bandage being non-stretching lengthwise during application with substantially closed meshes which can be opened and enlarged readily by lateral pull.

2. The bandage of claim 1 wherein the fabric is loosely knitted cloth.

3. The bandage of claim 2 wherein the cloth has two lengthwise-extending side edges that are off-set with respect to each other.

4. The bandage of claim 1 wherein the fabric is loosely woven cloth disposed on the bias.

5. The bandage of claim 1 wherein said threads are made from natural materials and said means comprises sizing in quantity and character sufficient to substantially stiffen the threads while insufficient to produce substantial adherence of the threads to each other.

6. The bandage of claim 1 wherein said threads are made from water-repellent fibers.

7. The bandage of claim 1 wherein said threads are made from fusible materials and said means comprises a small degree of fusing of the threads at said intersections, easily rupturable by intentional pull.

8. A non-adhesive bandage consisting essentially of a knit fabric having elongated narrow meshes capable of being widened and shortened substantially by sliding of the threads upon each other when the fabric is stretched widthwise, and having the loops of the threads engaging adjacent threads with sufficient resiliency to retain the elongated mesh form without substantial adherence of the threads to each other.

9. A non-adhesive surgical bandage having firmness and closed-mesh characteristics similar to a closely-woven cloth bandage during application while permitting lateral expansion to open the meshes and provide shearing action during removal, and consisting essentially of an adhesive-free loosely knit cloth fabric having threads arranged to enable at least 25% extension in one dimension by relative sliding movement of the threads at the intersections, with complementary contraction in the transverse dimension pre-extended to substantially its maximum length with threads crowded together closing the meshes, and means retaining said fabric in its extended closed-mesh condition against self-recovery therefrom by the conformation and stiffness of the intersecting threads, the bandage being non-stretching lengthwise during application with substantially closed meshes which can be opened and enlarged readily by lateral pull.

10. The bandage of claim 9 in which the pre-extension is in the direction of the course of the knitting.

11. The bandage of claim 9 in which the pre-extension is perpendicular to the direction of the course of the knitting.

12. The bandage of claim 9 in which the pre-extension is oblique to the direction of the course of the knitting.

13. The bandage of claim 9 in which the threads are, in themselves, elastic.

14. The bandage of claim 9 in which the cloth is knitted from two concurrent separate strands of thread, one being a synthetic fiber that retains its stiffness and its convolutions in the presence of tissue discharge, the other being a vegetable fiber that loses its stiffness and convolutions in the presence of a tissue discharge.

15. The bandage of claim 14 in which one said strand is more closely knit than the other.

16. The bandage of claim 14 in which said synthetic fiber strand is elastic.

17. The bandage of claim 9 in which said means comprises sizing in quantity and character to produce an easily breakable bond at the thread intersections.

18. A non-adhesive surgical bandage having firmness and closed-mesh characteristics similar to a closely-woven cloth bandage during application while enabling lateral expansion to provide open meshes and shearing action during removal, and an elongated strip of adhesive-free loosely woven cloth fabric with interstices normally larger than the threads, said strip having lengthwise threads and widthwise threads, said strip having its lengthwise threads off-set lengthwise and its widthwise threads oblique to the lengthwise threads, so that the interstices are substantially closed, and means retaining said fabrics in its off-set condition against self-recovery therefrom; the longitudinally disposed lengthwise threads providing longitudinal rigidity to the bandage during application and the obliquely disposed crosswise threads providing rhomboidal meshes of small area readily enlargeable by lateral pull on the bandage.

19. A non-adhesive surgical bandage having firmness and closed-mesh characteristics similar to a closely-woven cloth bandage during application while capable of lateral expansion with accompanying mesh opening and shearing action during removal and comprising an adhesive-free thread-type cloth fabric having numerous thread intersections arranged to enable at least 25% extension in one dimension by movement of the threads at the intersections relative to each other with complementary contraction in its transverse dimension, said fabric being pre-extended to substantially its maximum length, means retaining said fabric in its extended condition against self-recovery therefrom by the conformation and stiffness of the intersecting threads, and water-repelling means coating at least one surface of said fabric sufficient to retard the passage of wound discharge therethrough while permitting the passage of air therethrough.

20. The bandage of claim 19 wherein said threads contain a wetting agent.

21. The bandage of claim 19 wherein water repellent coats one side of the bandage and a wetting agent coats the other side of the bandage.

22. A flexible non-adhesive surgical bandage roll comprising a central flexible core, an elongated strip of adhesive-free thread-type cloth fabric having numerous thread intersections and interstices, said threads being arranged to enable at least 25% enlargement in widthwise dimension by movement of the threads at the intersections relative to each other with complementary contraction in its transverse dimension, said fabric being pre-extended lengthwise sufficiently to substantially close said interstices, means retaining said fabric in its pre-extended condition against self-recovery therefrom by the conformation and stiffness of the intersecting threads, said strip being narrower than said core and wound thereon with tension sufficient to provide a flexible bandage roll which can be bent to conform to various shapes to aid adjusting tension during application and which can be extended axially to open said interstices.

23. The roll of claim 22 wherein said core is cardboard.

24. The roll of claim 22 wherein said core is made from material possessing the property of spring recoil.

25. A non-adhesive surgical bandage roll consisting essentially of a loosely rolled strip of adhesive-free thread-type cloth fabric having numerous thread intersections and interstices between the threads that are elongated lengthwise and substantially closed, said threads being arranged to and enable widthwise extension of said strip sufficient to open said interstices to diameter larger than the threads, the widthwise extendibility providing a flexible roll which can be bent to various positions to aid in adjusting tension when applying the bandage to a patient.

26. A widthwise-extensible non-adhesive surgical bandage roll consisting essentially of a concentrically wound strip of an adhesive-free thread-type cloth fabric having numerous thread intersections and interstices normally larger than the threads, pre-extended to substantialy its maximum length to constrict said interstices until said fabric is pulled widthwise, and means retaining said fabric in its pre-extended condition against self-recovery therefrom, said pre-extension providing a flexible bandage roll which can be pulled axially to widen the bandage in any desired area thereof.

27. The bandage roll of claim 26 in which said strip is wound loosely without tension.

28. The bandage roll of claim 26 having a compressible smooth core on which said strip is wound and on which the material of said fabric will glide when extended in width.

29. The bandage roll of claim 28 in which said compressible core is folded fiber board.

30. The bandage roll of claim 28 wherein the core is longer than the width of the bandage.

31. The bandage roll of claim 28 wherein said roll is coreless and has a tubular axial passage centrally thereof.

32. A unitary plural-layer surgical dressing package having a first fabric layer to contact the tissues with smooth, closed-mesh characteristics, at least one additional fabric layer, and at least one absorbent filler layer interposed between adjacent fabric layers, all said layers being widthwise-expansible for opening of the meshes during application and removal, each said fabric layer comprising thread-type cloth having threads arranged to enable at least 25% extension in one dimension by movement of the threads relative to each other with complementary contraction in the transverse dimension with interstices variable in size from closed to larger than the threads, said first tissue-contact layer being extended essentially to its maximum length, each said other fabric layer being extended to less than its maximum length, means retaining all said layers retained in their respective degrees of extension, each said filler layer being of soft, absorbent, resilient, and extensible material, all said layers being lightly adhered together to form a unitary plural-layer surgical dressing which is non-stretching lengthwise during application and is stretchable widthwise in response to a widthwise pull with opening of the meshes thereby.

33. The plural-layer surgical dressing of claim 32 in which at least one fabric layer is water repellent.

34. The plural-layer surgical dressing of claim 32 in which at least one filler absorbent layer contains bacte-absorbing means.

35. The plural-layer surgical dressing of claim 32 in which at least one filler absorbent layer contains bactericidal material.

36. A unitary plural-layer surgical dressing package having a first fabric layer to contact the tissues with smooth, closed-mesh characteristics, a plurality of additional fabric layers, and a plurality of absorbent filler layers, each between a pair of said fabric layers, all said fabric layers being widthwise extensible and each fabric layer comprising thread-type cloth having threads arranged to enable at least 25% extension in one dimension by movement of the threads relative to each other with complementary contraction in the transverse dimension, variable in size between closed and larger than the threads with interstices, said first tissue-contact layer being extended essentially to its maximum length, said other fabric layers being extended to less than their maximum length, and means retaining all said fabric layers in their degrees of extension by the conformation and stiffness of the thread, said filler layers being of soft, absorbent, resilient, and extensible material, all said layers being joined together to form a unitary plural-layer surgical dressing which is substantially non-stretching lengthwise during application and is greatly stretchable widthwise in response to a widthwise pull with opening of the meshes thereby, at least one of the fabric layers being water repellent, at least one of said filler absorbent layers containing odor-absorbing means, and at least one of said filler absorbent layers containing bactericidal means.

37. A method for making the bandage material of claim 1, consisting essentially of applying heat and moisture to un-pre-extended fabric of the type claimed in claim 1, pulling on opposite ends thereof to close the meshes, and then applying heat and pressure to fix the fabric in its extended condition.

38. The method of claim 37 wherein sizing material is added before the step of fixing the fabric.

39. The method of claim 37 wherein the threads are of synthetic material and wherein the extended fabric is subjected to solvent and the solvent evaporated while said fabric is in the extended position.

40. A non-adhesive bandage consisting essentially of a loosely knit flattened fabric tube having elongated narrow meshes capable of being widened and shortened by sliding of the threads upon each other when the fabric is stretched widthwise, and means retaining said threads in the elongated mesh form without substantial adherence of the threads to each other.

41. The bandage of claim 40 wherein there is a plurality of elongated tubes, concentric with each other.

42. A bandage roll consisting essentially of the tube of claim 40 rolled into a cylindrical roll.

43. A surgical bandage having firmness and closed-mesh characteristics similar to closed-mesh woven cloth while permitting lateral expansion to provide mesh opening and shearing action during removal, consisting essentially of a cloth fabric having threads arranged to enable at least 25% extension in one dimension by movement of the threads relative to each other with complementary contraction in the transverse dimension and with interstices thereby variable in size between closed and larger than the threads, extended to substantially its maximum length and retained in its extended condition solely by the conformation and stiffness of the threads, the bandage being non-stretching lengthwise during application and having relatively closed meshes which can be enlarged readily during removal by lateral pull to provide said shearing action.

44. The bandage of claim 43 in which the stiffness to maintain the conformation of the threads in the extended condition is attained by the addition of fluid to the cloth and the later evaporation of the fluid from the cloth while the cloth is in the extended position.

45. The bandage of claim 43 in which the stiffness to maintain the conformation of the threads in its position of extension is attained by evaporating fluid from the cloth.

46. A surgical bandage, consisting essentially of a cloth fabric having threads arranged to enable at least 25% extension in one dimension by movement of the threads relative to each other with complementary contraction in the transverse dimension and having interstices reducible in size to substantially closed-mesh state by extension of the bandage lengthwise and openable in size to larger diameter than the threads by extension widthwise, extended in length to an amount that is somewhat less than its maximum length and retained in this condition of extension solely by the conformation and stiffness of the threads, whereby the bandage is stretchable lengthwise with closing of the meshes and is stretchable widthwise with opening of the meshes.

47. The bandage of claim 46 wherein the fabric is knitted cloth.

48. A surgical bandage consisting essentially of an elongated strip of adhesive-free woven cloth having essentially a series of substantially parallel longitudinally disposed warp threads and a series of substantially parallel obliquely disposed weft threads, the threads in at least one of said series lying sufficiently close to adjacent threads to form substantially closed meshes, the angle of obliqueness of the weft threads being sufficient to permit enlargement of said meshes to a diameter at least as large as the threads by deliberate lateral extension of the cloth, and the stiffness and configuration of the threads being sufficient to maintain said angle against self-deformation of said cloth.

References Cited by the Examiner

UNITED STATES PATENTS

| | | | |
|---|---|---|---|
| 781,142 | 1/1905 | Hanrath | 128—155 |
| 1,070,940 | 8/1913 | Bauer | 128—156 |
| 1,829,231 | 10/1931 | Mergentime | 128—290 |
| 2,690,415 | 9/1954 | Shuler | 128—156 |
| 2,705,692 | 4/1955 | Petterson | 128—290 |
| 2,764,976 | 10/1956 | Skiles et al. | 128—156 |
| 2,823,444 | 2/1958 | Davies et al. | 128—155 |
| 3,006,338 | 10/1961 | Davies | 128—156 |
| 3,097,644 | 7/1963 | Parker | 128—157 |
| 3,098,369 | 7/1963 | Burleson et al. | 66—202 |

FOREIGN PATENTS 891,963   3/1962   Great Britain.

OTHER REFERENCES

American Journal of Surgery, "Initial Treatment of Traumatic Wounds," Lt. Col. Gallagher, August 1942, pages 231–241.

U.S. application Serial No. 239,442, of Leon O. Parker, filed Nov. 23, 1962.

RICHARD A. GAUDET, *Primary Examiner.*

CHARLES F. ROSENBAUM, *Examiner.*